Jan. 15, 1924.
O. C. MILLER
1,481,218
APPARATUS FOR DRAWING SHEET GLASS
Filed Nov. 10, 1921
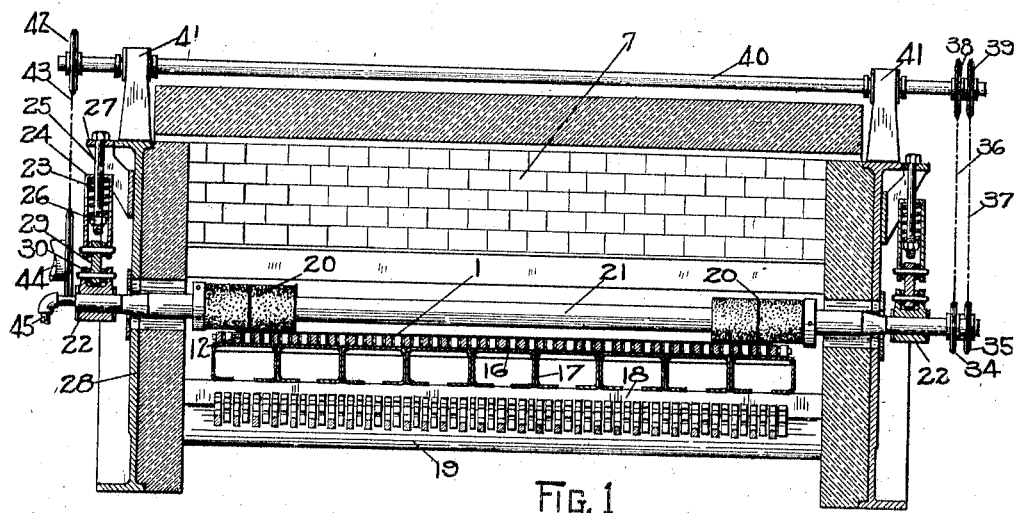
Fig. 1
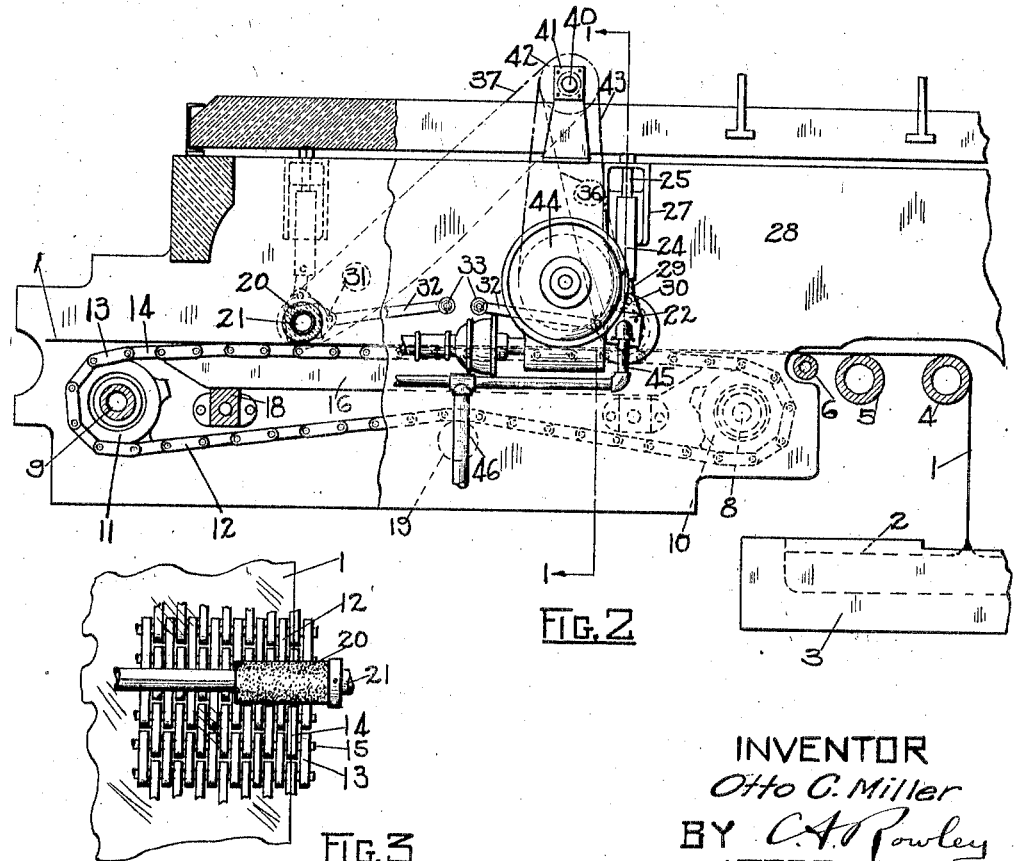
Fig. 2
Fig. 3
INVENTOR
Otto C. Miller
BY C. A. Rowley
ATTORNEY Patented Jan. 15, 1924.

1,481,218

UNITED STATES PATENT OFFICE.

OTTO C. MILLER, OF CHARLESTON, WEST VIRGINIA, ASSIGNOR TO THE LIBBEY-OWENS SHEET GLASS COMPANY, OF TOLEDO, OHIO, A CORPORATION OF OHIO.

APPARATUS FOR DRAWING SHEET GLASS.

Application filed November 10, 1921. Serial No. 514,129.

*To all whom it may concern:*

Be it known that I, OTTO C. MILLER, a citizen of the United States, residing at Charleston, in the county of Kanawha and State of West Virginia, have invented new and useful Improvements in Apparatus for Drawing Sheet Glass, of which the following is a specification.

This invention relates to improvements in the art of drawing sheet glass from a mass of molten glass, and more especially to an improved form of drawing mechanism which continuously draws the sheet from the molten source, and also serves simultaneously to flatten the still plastic sheet into its final plane form, without marring or scratching it.

While this present invention is of general application, it is here shown as used in the well-known Colburn system of drawing sheet glass, wherein the sheet is drawn vertically from the molten source, bent over a cooled roller into the horizontal plane and then drawn off through a suitable drawing and flattening mechanism, enclosed in a heated chamber, into a leer. This system is disclosed in detail in the patent to I. W. Colburn, 1,248,809, granted Dec. 4, 1917. In a later patent, numbered 1,274,385, granted to I. W. Colburn, on August 6, 1918, is disclosed and claimed a specific form of drawing mechanism for use in the above sheet-drawing system. This drawing mechanism comprises a stationary horizontal table or support, and a movable drawing table in the form of an endless belt of intermeshing links, which form a substantially flat smooth surface, the drawing table sliding over the stationary table, and carrying the sheet of glass on its upper surface. Above the drawing table is a second moving endless belt, composed of a series of linked cross-bars which rest on the edge portions of the glass sheet, holding the sheet against the drawing-table and assisting the table in the sheet-drawing operation.

Some trouble has been experienced with this upper endless series of cross-bars or draw-bars, due to breakage of parts, and occasional marring of the glass sheet. The present apparatus is designed to avoid these difficulties by substituting for the endless series of draw-bars, a plurality of driven rollers which rest upon the upper edge portions of the glass sheet and perform the same function as the draw-bars in a simpler and more efficient manner.

The invention will be better understood from the following detailed description of one form of apparatus for carrying out the ideas of this invention. In the accompanying drawings:

Fig. 1 is a vertical cross-section through the apparatus, taken substantially on the line 1—1 of Fig. 2.

Fig. 2 is a partial side elevation of the apparatus and enclosing chamber, the left-hand portion of the view being shown partially broken away and in section to disclose more clearly the parts within the chamber.

Fig. 3 is a plan view of a fragment of the drawing table and one of the drawing rollers.

In a sheet glass drawing system of the type here shown, as set forth in detail in the Colburn patents noted above, the glass sheet 1, is drawn upwardly from the molten glass 2 in receptacle 3, bent horizontally over the cooled bending roll 4, and drawn off over the intermediate rolls 5 and 6, into the heated chamber 7. Within this chamber 7 is located the sheet drawing mechanism about to be described.

Journaled in suitable bearings in the side walls of the enclosing structure are two cross shafts 8 and 9, each carrying a series of sprocket wheels 10 and 11, which carry and drive the drawing table 12, which is in the form of an endless belt. The type of belt here shown is composed of interlocking series of links 13 and 14, the overlapping ends of each two adjacent series of links being journaled on a cross pin 15. This form of table has a substantially flat upper surface, with no large or continuous apertures, and it is on this surface that the glass sheet flattens out into its final plane form.

It is essential that this drawing table in its upper horizontal run, whereon the glass sheet rests should present a smooth level surface, and in order to prevent the flexible belt from sagging and presenting a curved or uneven upper surface, this horizontal run is supported by a stationary table 16, composed of a series of channel members 17, supported on cross bars 18. The upper plane surface of this stationary table 16 acts as a guide and support for the flexible moving drawing table 12. The lower idler run of belt 12, is supported by the idler roll 19.

The form of drawing table described above is substantially the form disclosed and claimed in the Colburn Patent 1,274,385, above noted. It is obvious that many variations in the form of the articulated table 12 could be designed, and the upper drawing rollers now about to be described would be operative with any of these various forms of flexible drawing tables.

Mounted above the drawing table and the glass sheet, and resting yieldably thereupon, are a plurality of pairs of rollers 20, here shown as two pairs, the rollers of each pair resting upon the opposite edge portions of the glass sheet. These rolls are preferably composed of or covered with asbestos, although other materials might be used, and the rollers of each pair are fixed to a rotating driven cross shaft 21, which extends through apertures in the opposite side walls of the enclosing structure and is carried by bearings 22. Each of these bearings 22 is yieldably supported from above. A compression spring 23, within a casing 24 and around a bolt 25, is supported at one end by adjustable nut 26, on the bolt 25, which bolt is supported at its upper end from bracket extension 27 of the side wall 28. The casing 24 is carried by the upper end of spring 23, and the bearing 22 is carried from the lower end of casing 24 by the link 29, pivoted to the lower end of the casing and to ears 30 on bearing 22. In this way a portion of the weight of the shaft 21 and rollers 20 is yieldably supported from the side walls of the chamber 7, the rollers 20 only resting upon the edge portions of the glass sheet 1 with sufficient pressure to hold the sheet firmly upon the table 12, so that the table and the rollers will secure an adequate drawing traction upon the glass sheet. Connected to a second pair of ears 31, extending from bearing 22, substantially at right angles to ears 30, is a link 32, the other end of the link being pivoted to the side wall 28 at 33. These links hold the bearings 22, and consequently the shafts 21 and rollers 20, against lateral movement, while allowing them to move up and down against gravity or the springs 23, as inequalities in the sheet, or the passage of the bait or other obstructions may necessitate.

The rolls 20 are all driven uniformly, and at the same peripheral speed as the linear speed of the drawing table 12, to assist in drawing the glass sheet. This drive is accomplished through a sprocket such as 34 or 35, at one end of each shaft 21 connected by sprocket chains 36 and 37, to sprockets 38 and 39, fixed to overhead drive shaft 40, mounted in bearings 41 above the chamber 7. At the other end of shaft 40, is fixed a sprocket 42, driven through sprocket chain 43 from any suitable source of power 44, which may be a portion of the drive mechanism for the drawing table 12. The form of drive described above is only illustrative of many that might be devised to drive the several rollers 20 at a uniform speed, and at the same time allow for the occasional vertical movement of the rollers.

In order to avoid the overheating of the shafts 21 and rollers 20, and maintain them at the proper temperature for contact with glass sheet 1, a current of cooling air is blown in at one end of each shaft 21, (the shafts being hollow), the air passing out at the other open end of the shaft. As shown in Figs. 1 and 2, the air is fed in through a pipe 45, connected with a suitable supply pipe 46.

Long use has shown that the glass sheet may be drawn forward and flattened upon a drawing table, such as shown at 12, without injury to the sheet, and it has been proven in practice that the series of drawing rollers 20, lightly engaging the edge portions of the sheet, afford adequate traction in cooperation with the drawing table, to draw the sheet continuously from the molten bath 2. After the drawing of the sheet has been started, and the continuous sheet is running through the draw-mechanism and leer, a single pair of the rollers 20, one at either side of the sheet, will often be found sufficient to maintain the traction against the drawing table, and the other rollers may be raised out of engagement with the sheet.

Obviously many modifications of the form, proportions and structure of the rollers 20, might be made without departing from the essential features of this invention as covered by the following claims. It is to be understood that suitable heating means, not shown, are employed to keep the chamber 7, and the mechanism running therein, at the proper temperature to engage the glass sheet without injuring the same.

Claims:

1. In a machine for drawing sheet glass, a source of molten glass, and means for drawing a sheet of glass therefrom, comprising an endless carrier which acts as a flattening table for the sheet, and a plurality of positively driven rollers engaging the upper edge portions of the sheet, to hold the sheet in engagement with the table and assist in the drawing operation.

2. In a machine for drawing sheet glass, a source of molten glass, and means for drawing a sheet of glass therefrom, comprising an endless carrier which acts as a flattening table for the sheet, a plurality of pairs of rollers resting on the opposite edge portions of the sheet from above and holding the sheet in engagement with the table, means for yieldingly supporting part of the weight of the rollers, and means for positively and uniformly rotating the rollers to assist in the drawing operation.

3. In a machine for drawing sheet glass, a source of molten glass, and means for drawing a sheet of glass therefrom, comprising a moving supporting and flattening table for the sheet, and a plurality of positively driven rollers directly engaging the edge portions of the sheet to hold the same against the table and assist in the drawing operation.

4. In a machine for drawing sheet glass, a source of molten glass, and means for drawing a sheet of glass therefrom, comprising an endless carrier and flattening table for the sheet, means for driving the carrier, a plurality of cross-shafts above the sheet and table, rollers carried by the shafts engaging the edge portions only of the sheet, means at either end of the shafts for yieldingly supporting a portion of the weight thereof, and means for driving the shafts in unison.

5. In a machine for drawing sheet glass, a source of molten glass, and means for drawing a sheet of glass therefrom, comprising an endless carrier and flattening table for the sheet, means for driving the carrier, a plurality of cross-shafts above the sheet and table, asbestos rollers carried by the shafts engaging the edge portions only of the sheet, means at either end of the shafts for yieldingly supporting a portion of the weight thereof, and means for driving the shafts in unison.

6. In a machine for drawing sheet glass, a source of molten glass, and means for drawing a sheet of glass therefrom, comprising an endless carrier and flattening table for the sheet, means for driving the carrier, a plurality of cross-shafts above the sheet and table, asbestos rollers carried by the shafts engaging the edge portions only of the sheet, means at either end of the shafts for yieldingly supporting a portion of the weight thereof, means for driving the shafts in unison, and means for internally cooling the shafts and rollers.

7. In a machine for drawing sheet glass, a source of molten glass, means for drawing a sheet of glass therefrom, and a heated chamber in which the drawing means is located and through which the sheet passes, the drawing means comprising an endless carrier and flattening table supporting the sheet, a plurality of rollers engaging the upper edge portions of the sheet, and means for driving the rollers in unison to assist in the drawing operation.

8. In a machine for drawing sheet glass, a source of molten glass, means for drawing a sheet of glass therefrom, and a heated chamber in which the drawing means is located and through which the sheet passes, the drawing means comprising an endless carrier and flattening table supporting the sheet, a plurality of rollers engaging the upper edge portions of the sheet, means for driving the rollers in unison to assist in the drawing operation, and means for internally cooling the shafts and rollers.

9. In a machine for drawing sheet glass, a source of molten glass and means for drawing glass therefrom in sheet form, said means comprising a stationary horizontal table or support, and a drawing table consisting of an endless belt of longitudinally extending links arranged in transverse series with the links of each series alternating with and overlapping those of the adjacent series, with the overlapping portions in close juxtaposition to each other, and means for driving said drawing table with its horizontal run resting upon and supported by said stationary table, and a plurality of yieldingly supported positively driven rollers above the drawing table for engaging the edge portions of the glass sheet and assisting in the sheet drawing operation.

10. In a machine for drawing sheet glass from a source of molten glass, the combination of a stationary table having a flat horizontally extending surface, with a driven endless drawing table composed of a plurality of series of longitudinally extending links with the links of one series in close juxtaposition to those of the adjoining series and with the pivotal portions of the links in adjacent series alternating, and means for driving said drawing table with its horizontal run resting upon and supported by said stationary table, the glass sheet being carried by and flattened upon said drawing table, and a plurality of positively driven rollers above the drawing table for engaging the upper edge portions of the sheet and assisting in the sheet drawing operation.

Signed at Kobe, Prefecture of Hyogo, and Empire of Japan, this 14th day of October, 1921.

OTTO C. MILLER.